Sept. 14, 1926.
R. B. OWEN
1,599,836
STORAGE BATTERY
Filed May 10, 1920
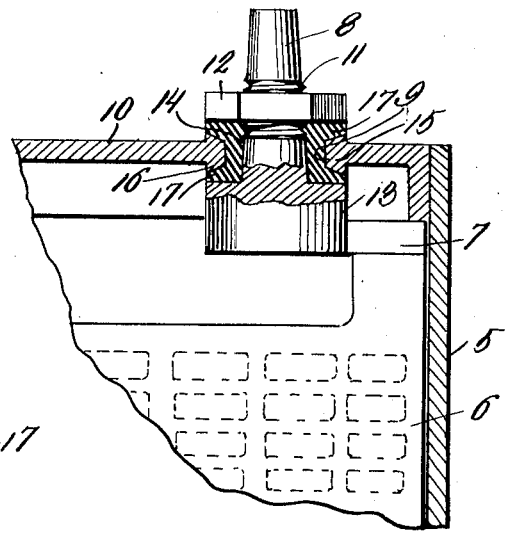
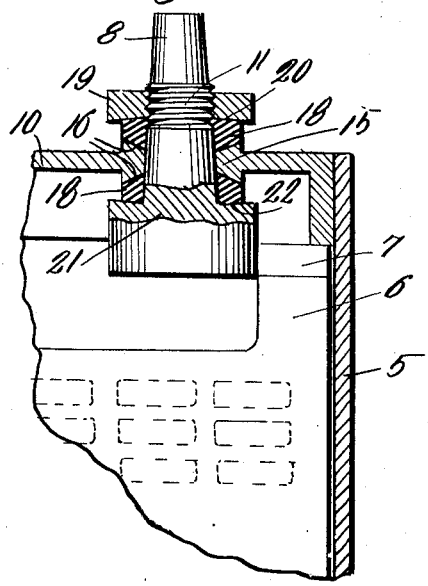
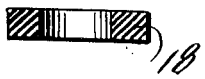
WITNESSES
Guy M. Spring
Inventor
Richard B. Owen.

Patented Sept. 14, 1926.

1,599,836

UNITED STATES PATENT OFFICE.

RICHARD B. OWEN, OF WASHINGTON, DISTRICT OF COLUMBIA.

STORAGE BATTERY.

Application filed May 10, 1920. Serial No. 380,257.

This invention relates to new and useful improvements in storage batteries, and the primary object of the invention is to provide seals for the terminal post openings in the cover of a battery jar, in order to preclude the splashing and "creeping" of the electrolyte through the post openings, and which function, to a certain extent, to yieldingly brace and support the terminal posts.

Another object of the invention is to provide means for compressing yieldable means around the terminal post and upon opposite sides of the cover to overlap the edge of the opening whereby a fluid tight seal is effected.

Another object of the invention is to provide a device of the above nature which is of simple and inexpensive construction, durable and efficient in practice.

Other objects and advantages of the invention will become apparent during the course of the following description.

In the accompanying drawings, forming a part of the application, embodiments of my invention which are at present preferred, are shown, but it is to be understood that I do not desire to limit myself to the construction, arrangement and combination of the various parts herein shown and that I may resort to various changes in the construction, arrangement and combination of the various parts of the invention to be hereinafter described and set forth in the appended claims.

In the drawings, wherein like numerals are employed to designate like parts throughout the several views—

Figure 1 is a view mainly in section of the corner of a storage battery illustrating my invention applied thereto.

Figure 2 is a section through the yieldable bushing forming a part of the invention.

Figure 3 is a view similar to Figure 1 illustrating a modified form of the invention, and Figure 4 is a section through a gasket used in connection with this modified form of the invention.

Referring to the drawings wherein is shown preferred embodiments of the invention, the numeral 5 designates a battery jar having assembled therein the usual group of battery plates 6. Each group is united by straps of any desired type, one of which is shown at 7 and which is provided with an upwardly tapering terminal post 8. This post extends through the opening 9 in the jar cover 10 and is screw threaded as at 11 above the cover as illustrated to receive a jam nut 12 for a purpose to be hereinafter set forth. A portion of the post beneath the cover is provided with an annular flange 13 which forms an abutment for one end of a bushing 14 which is placed upon the post. The edge of the opening 9 is formed into an annular enlargement 16, the upper and lower faces of which converge inwardly toward the terminal post as at 16.

The bushing 14 is of a yielding nature and is preferably constructed from soft rubber in order that it may be deformed to snugly engage the terminal post and enlargement 15 when pressure is brought to bear thereon, as will be more clearly set forth hereinafter. A pair of outwardly extending flanges 17 are formed upon the bushing in spaced relation to each other whereby the central or body portion of the bushing may be retained within the opening in the cover and the flanges of the bushing overlapped and engaged with the converging faces of the enlargement.

When the bushing is positioned upon the post and arranged within the opening in the cover, its lower flange abuts with the terminal post flange. Pressure upon the bushing is furnished by the nut 12 being threaded upon the terminal post and which causes the flanges of the bushing to be compressed into binding engagement with the enlargement 15. This binding action is caused by the nut bearing upon the upper flange of the bushing during rotation of the nut, and consequently causes the terminal post to move upwardly whereby its flange 13 exerts an upward pressure upon the lower part of the bushing. It will therefore be apparent that the yieldable bushing is compressed between the nut and the post flange to cause it to expand within the cover opening 9 and snugly engage both the post and the walls of the opening. Due to the converging faces of the enlargement 15 and the pressure exerted upon the bushing, its flanges 17 will be forced inwardly to enlarge the body portion of the bushing, as well as to cause the flanges to snugly engage the enlargement whereby a fluid tight seal is established. It is believed that this bushing, due to its flanges cooperating with the flange 13, and the body portion cooperating with the opening and enlargement 15 in the manner set forth, will prevent with a degree of certainty the "creeping" of the electrolyte between the post and the cover opening and thereby obviate the trouble usually caused by the electrolyte lodging upon the outside of the cover.

Referring to the form of invention illustrated in Figures 3 and 4, I use a pair of soft rubber gaskets 18 which surround the terminal post upon opposite sides of the cover 10. The nut embodied in this form of invention has its lower face provided with a conical depression or concavity as at 20 while the upper face of the post flange 21 is similarly equipped with a concavity 22.

Before positioning the cover on the jar, in this form of invention, a yieldable gasket is placed upon the post and forced down to engage the concaved face 22 of the post flange. After the cover has been assembled with the post projecting through the opening, a second gasket is placed upon the post and forced down upon the upper inclined face of the enlargement 16, after which the nut 19 is threaded upon the post. This nut upon reaching its upper gasket causes compression of the latter and upon further rotation of the nut, the terminal post is caused to move upwardly so that its flange 21 compresses the lower gasket against the lower inclined face of the enlargement 15. Continued rotation of the nut increases the pressure upon the yieldable gaskets, and due to the formation of the enlargement and lower and upper faces of the nut and post flange respectively, the washers are compressed inwardly toward the post as well as snugly against the enlargement so that the center portion of each washer is enlarged considerably and a fluid tight seal is effected. It will also be appreciated that the bushing 17 and gasket 19 being possessed of yielding qualities, will provide effective means for absorbing shocks usually imposed upon the groups of battery plates and terminal posts when the storage battery is subjected to the treatment received in its commercial uses.

Having thus fully described my invention, what is claimed is:—

1. A storage battery including a cover with an opening through which a terminal post of the battery plates projects, said cover opening having its margin thickened to provide a rim of truncated cone-shape in cross section, a bushing mounted on the post and provided with a groove to accommodate said rim, and means to compress said bushing into impingement with said post and rim.

2. A storage battery including a cover with an opening through which a terminal post of the battery plates projects, said cover opening having its margins thickened to provide a rim of truncated cone-shape in cross section, compressible elements mounted on the post and engaged with the inner and outer faces of said rim, and means to compress said elements into impingement with said post and rim.

3. A storage battery including a cover with an opening therein and storage battery plates with a post for engagement through said opening, the margin of said opening being thickened and having the upper and lower faces thereof converged toward said post, and a bushing sleeved on said post and provided with a groove to receive said thickened portion, the inner terminal of the bushing impinging against a shoulder on the post, and a nut threaded on said post and engageable with the outer terminal of the bushing to compress the latter against the post and the thickened portion of the cover opening.

In testimony whereof I affix my signature.

RICHARD B. OWEN.